UNITED STATES PATENT OFFICE 2,185,449

MOTION TRANSMITTER

Vincent V. Veenschoten, Erie, Pa., assignor to Northern Equipment Company, Erie, Pa., a corporation of Pennsylvania Application February 3, 1937, Serial No. 123,808

2 Claims. (Cl. 121—38)

This invention relates to motion transmitters, by means of which any movement which may be produced by fluid pressure, mechanical means, or in any other manner, may be transmitted long distances, and reproduced proportionally to the original motion. At the same time means are provided for increasing the power applied as much as may be desired. The general object of the invention is to provide means whereby any movement applied to the apparatus will be reproduced proportionally, whether or not the movement applied is slight or very great, and changes in direction of the applied motion will be reproduced immediately by the apparatus.

A further object is to increase the energy or power delivered over that which is applied so much as may be desired, but without affecting the actual movement delivered. But, if desired, the amount of movement, that is the rate of movement delivered, may be varied from the rate applied as much as may be desired.

A further object is to provide means for transmitting the motion long distances with extremely simple apparatus, with little friction loss or wear of apparatus. A further object is to transform fluid pressure into mechanical movement and at the same time deliver the movement long distances. Other objects will be apparent from a consideration of the accompanying drawings and the following description thereof.

For convenience herein I have referred to the apparatus which I provide for these purposes as a "transimotor", and refer to the motion delivering apparatus as the transmitter and to the motion receiving apparatus as the receiver.

Figure 1:
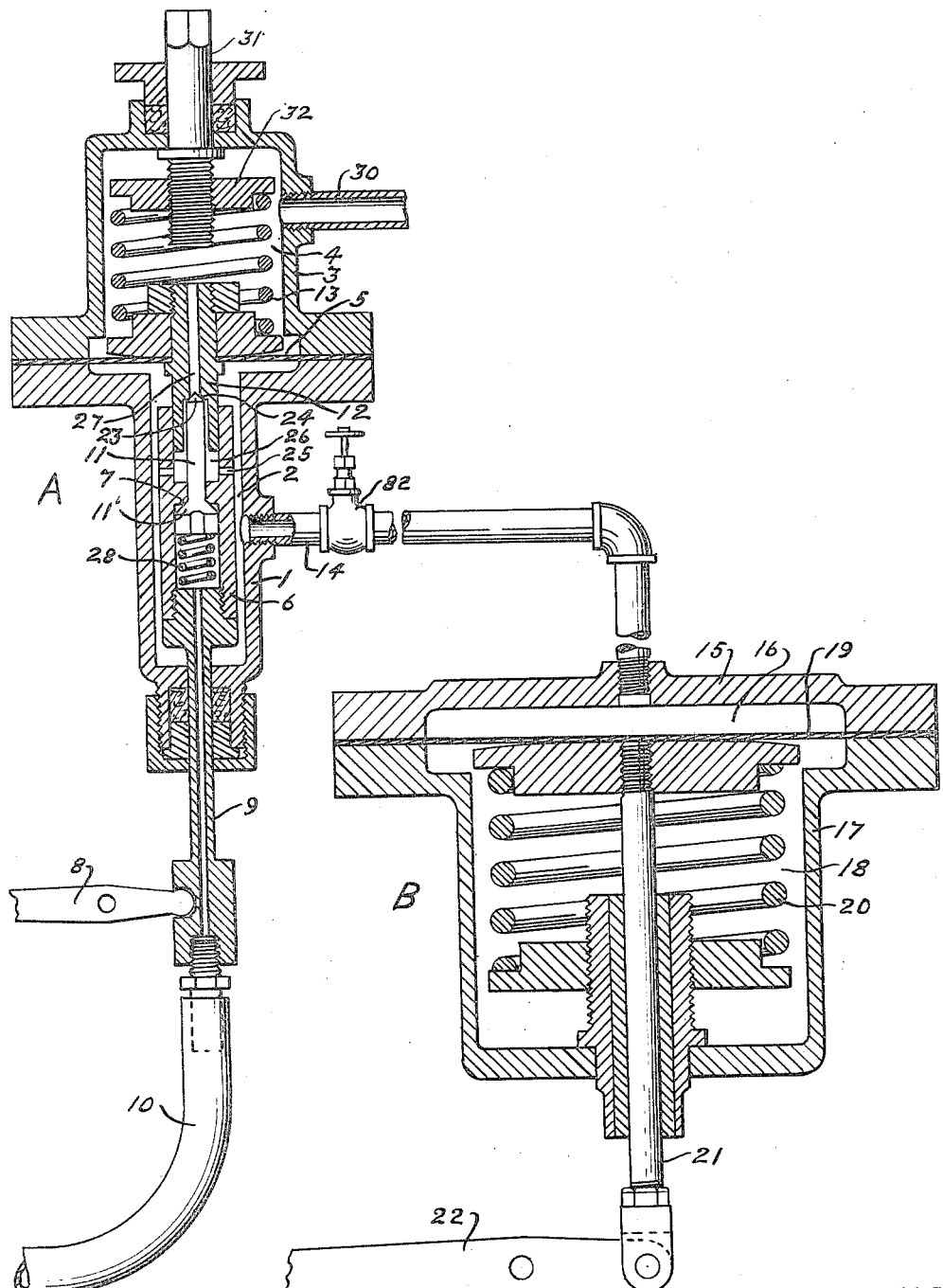
Figure 2:
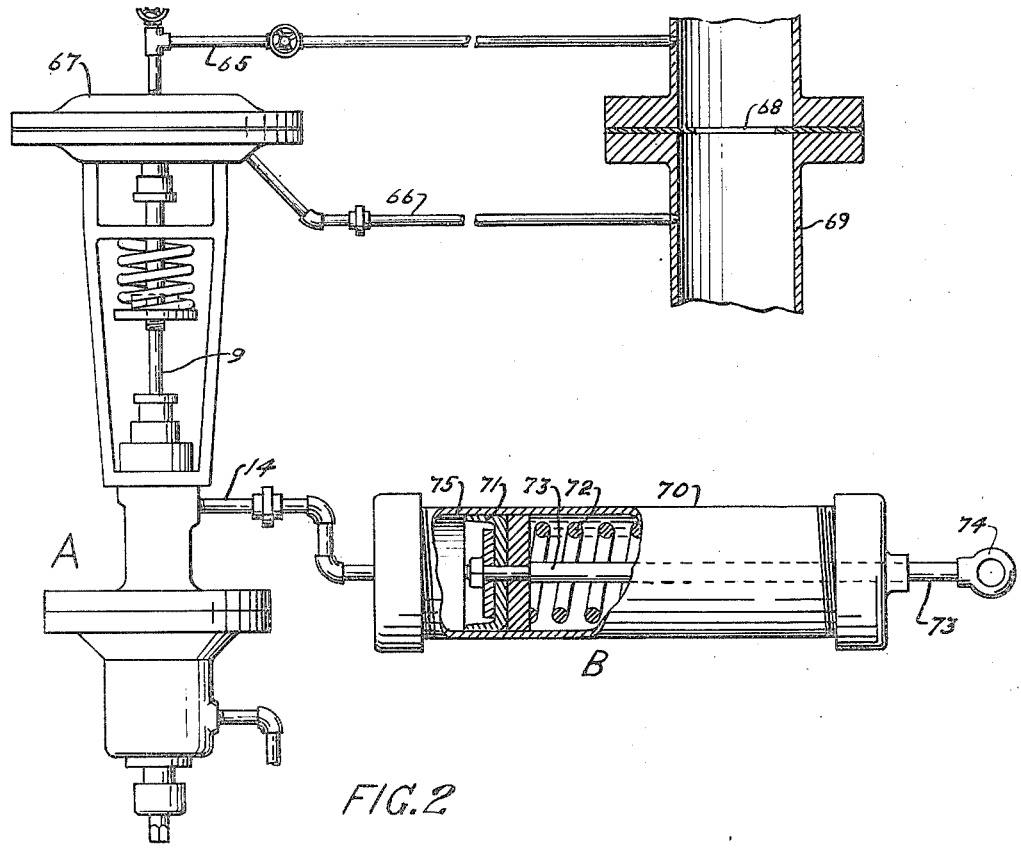
Figure 3:
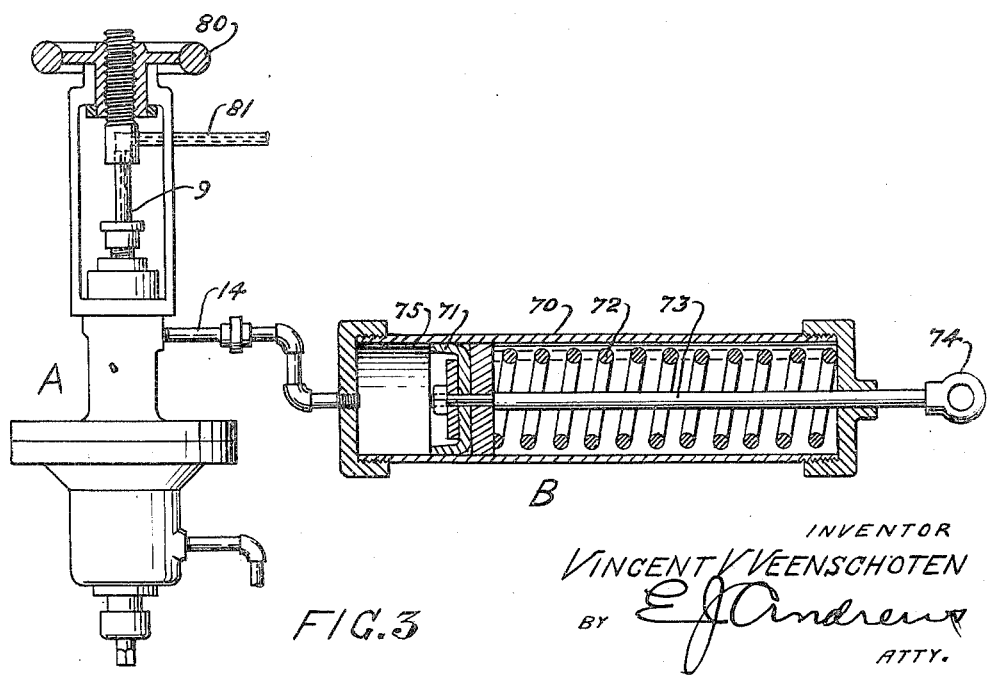

Of the drawings Fig. 1 is a central sectional elevation of a transmitter and a receiver which embodies the features of my invention; Figs. 2 and 3 illustrate the apparatus used for transmitting motion generally.

Referring to Fig. 1, the transmitter A of the "transimotor" comprises a casing 1, having an inner chamber 2, and a casing 3 having an inner chamber 4. The chambers are separated by a diaphragm 5. Within the chamber 2 is slidably mounted a tubular member 6 which carries a valve seat 7. Motion is applied to the transmitter by any means suitable for moving the member 6 in the casing 1. In this instance motion may be applied by means of a lever 8 pivotally connected to a tube 9 which is fixed to the member 6.

In operation fluid under pressure is passed to the transmitter by any suitable means, such as a flexible tube 10, which is connected to the outer end of the tube 9. When the lever 8 is operated to elevate the member 6, the valve seat 7 is moved away from its coacting valve 11'. Movement of the valve is prevented by a stem 11 fixed to the valve, and which normally presses against the tubular member 12 which is fixed with reference to the diaphragm 5. Upward movement of the diaphragm is opposed by the spring 13.

When the seat 7 is thus forced away from the coacting valve 11', the pressure fluid is free to pass into the chamber 2 through the valve port, and from thence to pass through the tube 14 into the receiver B. The receiver comprises a casing 15 having a chamber 16 therein, and a casing 17 having a chamber 18 therein. These two chambers are separated by a diaphragm 19. When the fluid pressure becomes effective in the chamber 16, which communicates with the pipe 14, the diaphragm is forced downwardly against the opposing spring 20. Fixed to the diaphragm is a rod 21, which is thus operated by the fluid pressure. Any desired apparatus may be associated with the rod 21 for actuation, such as the lever 22.

In order to suitably control the motion which is thus transmitted, I provide the valve 23 coacting with the valve seat or port 24. When the pressure in the chamber 2 builds up sufficiently to overcome the force of the spring 13, the diaphragm 5 is forced upwardly, carrying with it the member 12 and the seat 24 of the valve 23. This allows the stem 11 and the valve 11' to move upwardly and to close the port 7, thus preventing further flow into the chamber 2, but maintaining in that chamber pressure sufficient to hold the diaphragm 19 in its adjusted position. Thus the effect of the movement of the lever 8 will be transmitted to the lever 22. If the movement of the lever 8 is very material, the pressure built up in chamber 2 will be correspondingly great, and the movement of the lever 22 will be also corresponding, or a slight movement of the lever 8 will produce a corresponding pressure change and movement of the lever 22.

If the movement of the lever is slight the diaphragm 5 will move slightly and close the valve 11', and if a further movement in the same direction is to be transmitted, the lever 8 is moved further and a corresponding movement will be transmitted to the lever 22, and this may be repeated until the limits of the apparatus are reached; or the limits may be reached by a single movement of the lever 8 if desired.

If, now, it is desired to move the lever 22 in the opposite direction, the lever 8 is moved in the opposite direction, or downwardly, so as to move the tube 9 downwardly. This will force downwardly the member 6 and the stem 11, allowing the port 24 to open and thus allowing the fluid pressure to flow through the ports 25, the chamber 26 and the port 24, into the chamber 4, which is maintained at a lower pressure than the fluid pressure delivered to the transmitter. As soon as the pressure is thus reduced in the chamber 2, the diaphragm 5 will be forced downward by the spring 13, thus closing the port 24. This reduction in pressure in the chamber 2 allows the pressure to reduce in chamber 16 of the receiver, thus allowing the spring 20 to force upwardly the diaphragm 19, carrying with it the rod 21 and operating the lever 22 in the opposite direction.

Also, in this way, any movement of the lever 8, whether material or slight, is transmitted correspondingly to the lever 22, so that the limits of the apparatus may be reached by a single movement of the lever 8 or by any number of slight movements.

Any suitable pressure may be maintained in the chamber 4 by connecting the chamber, by means of the pipe 30 with any suitable apparatus, or the chamber may be open to the atmosphere. This pressure must be lower than the pressure applied to the transmitter through the tube 14, but the exact pressure is not material, as the pressure on the diaphragm 5 may be varied by varying the force acting thereon of the spring 13. This spring is backed by the disk 32 and the position of this disk is adjustable by means of the rod 31 which is threaded into the disk and extends out of the casing 3.

The rate of movement of the lever 22 with reference to that of the lever 8 may be varied by any suitable mechanical means; and the power received with reference to that delivered to the transmitter may be varied by varying the relative areas of the diaphragms, or, by suitable adjustments, by merely varying the relative force of the springs 13 and 20.

With this apparatus, in general, there will be definite pressures set up in the chamber 2 for given positions of the tube 9, and this will result in definite positions of the rod 21. Also there will be a tendency for both valves to remain closed after the pressure in chamber 2 has arrived at the correct value for the given position of the pipe 9. Also, if the pressure in chamber 2, for any reason, is lower than the correct value, the diaphragm 5 will move towards the chamber 2 and will thus open the valve 11'; if the pressure is too high, the diaphragm 5 will move in the opposite direction and will thus open the valve 23, allowing the pressure to reduce to the proper value.

There is no loss of fluid with the apparatus except the slight amount necessary to reduce the pressure in the chamber 2, and that only when the valve 23 is open as the pipe 9 moves outwardly. Also variations in pressure delivered to the transmitter through the pipe 14 have no effect on the operation of the apparatus, except, possibly, to change the time in which a certain change can take place; but they do not change the positions of the rod 21.

The "transimotor" may be applied to a number of different uses; such as the operating means of feed water regulators, pump governors, dampers, gates, locomotive reversing gears, and so forth. The accompanying Figures 2 and 3 show its application to various devices. Also one transmitter may be used to operate several receivers, and the power and speed of movement of each receiver could be varied to suit the particular need, without reference to the details of the transmitter.

Fig. 2 illustrates the use of the apparatus to transform a slight force into a powerful one at a distance. The transmitting apparatus in this case is substantially as described in reference to Fig. 1, but the pipes 65 and 66, which are in communication with the two sides of the diaphragm in the casing 67, are also in communication with both sides of an orifice 68 in a pipe 69. When a fluid is flowing through this pipe, and any variation in the flow occurs, the drop in pressure through the orifice will vary, and this variation transmitted to the diaphragm casing 67 will vary the position of the pipe 9 of the transmitter A.

The receiver in this instance is shown as a cylinder 70. One end of the cylinder is in communication with the pipe 14 from the transmitter, and in the cylinder is a packing 71 backed by a spring 72. Fixed to the packing is a stem 73 which passes out of the end of the cylinder and has means, 74, on its end for connection with any apparatus that is to be operated. The pipe 9 is in communication with the chamber on one side of the diaphragm in the casing 67, and thus pressure from the pipe 69 is transmitted to the chamber 75 of the receiver. However, pressure from any source can be applied to the pipe 9, and thus as powerful a force as may be desired may be produced in the chamber 75, although the drop in pressure through the orifice may be very slight.

Fig. 3 illustrates the apparatus arranged for manual operation. A hand wheel 80 is arranged to operate the pipe 9, forcing it inwardly or outwardly as may be desired, while the pipe 81 supplies fluid pressure to the pipe 9, the two pipes being in communication with each other. The receiver in this case is shown as substantially the same as that of Fig. 2. With this apparatus extremely slight movements may be imparted to the transmitter A and proportional movement effects will be transmitted to the receiver B, the effective force at the receiver, however, being as great as may be desired.

It will thus be seen that I have produced an apparatus for transmitting motion long distances and in proportion to the magnitude of the motion applied, and that the rate of movement or the power transmitted may be magnified or diminished as much as may be desired. As will be seen, the inlet valve is closed just as soon as the pressure admitted becomes proportional to the opening of the valve and this at once stops the effect on the receiver, if liquid pressure is used; if gas pressure is used the effect on the motor cannot be greater than the pressure admitted.

It will be understood that any mechanism may be applied to the outer end of the rod 73 in order to increase or diminish the movement with reference to the rod as much as may be desired. For instance a lever similar to the lever 22 of Fig. 1 may be used, and used as a first class, second class or third class lever.

I claim as my invention:

1. A motion transmitter comprising a casing having a chamber therein normally containing a fluid under pressure, a fluid pressure motor operatively associated with the chamber, a fluid inlet tube slidably mounted in one wall of the chamber, the opposite wall being resiliently yielding, an outlet tube fixed in the yielding wall, the inner ends of the tubes being slidably relatively, each tube having a normally closed valve with its seat fixed to its tube and its plug being positioned between its seat and the first mentioned wall, the plugs being connected by a stem slidably mounted in the inner ends of the tubes, and resilient means normally holding the plugs against the seats, respectively, and means for sliding the inlet tube in its wall, whereby inward movement of the tube in the wall will open the inlet valve, and outward movement will open the outlet valve, and in either case the varying fluid pressure resulting in the chamber will close the valve.

2. A motion transmitter comprising a casing having a chamber therein normally containing a fluid under pressure, a fluid pressure motor operatively associated with the chamber, a fluid inlet tube slidably mounted in one wall of the chamber, the opposite wall being resiliently yielding, an outlet tube fixed to the yielding wall, each tube having a valve with its seat fixed to the tube and its plug positioned between its seat and the first mentioned wall, the plugs being connected by a stem slidably mounted in the inner ends of the tubes, resilient means normally holding each plug against its seat, and means for sliding the inlet tube in its wall.

VINCENT V. VEENSCHOTEN.